United States Patent [19]
Mann

[11] Patent Number: 6,081,894
[45] Date of Patent: *Jun. 27, 2000

[54] METHOD AND APPARATUS FOR ISOLATING AN ENCRYPTED COMPUTER SYSTEM UPON DETECTION OF VIRUSES AND SIMILAR DATA

[75] Inventor: Steven D. Mann, Stockbridge, Ga.

[73] Assignee: RVT Technologies, Inc., Lilburn, Ga.

[ * ] Notice: This patent is subject to a terminal disclaimer.

[21] Appl. No.: 08/984,608

[22] Filed: Dec. 3, 1997

Related U.S. Application Data

[63] Continuation-in-part of application No. 08/955,912, Oct. 22, 1997.

[51] Int. Cl.[7] .................................................. H04K 1/00
[52] U.S. Cl. ........................................... 713/188; 713/200
[58] Field of Search .................................... 713/200, 188, 713/200.1; 364/222.5, 286.4; 380/4; 709/227; 359/109, 154, 704; 714/38

[56] References Cited

U.S. PATENT DOCUMENTS

| | | | |
|---|---|---|---|
| 4,405,829 | 9/1983 | Rivest et al. | 178/22.1 |
| 5,319,776 | 6/1994 | Hile et al. | 395/575 |
| 5,434,562 | 7/1995 | Reardon | 340/825.34 |
| 5,652,685 | 7/1997 | Ketchersid, III | 360/125 |
| 5,815,571 | 9/1998 | Finley | 380/4 |
| 5,826,013 | 10/1998 | Nachenberg | 395/186 |
| 5,832,208 | 11/1998 | Chen et al. | 395/187.01 |
| 5,842,002 | 11/1998 | Schnurer et al. | 395/500 |
| 5,909,493 | 6/1999 | Motoyama | 380/25 |

*Primary Examiner*—Gail O. Hayes
*Assistant Examiner*—Christopher M. Tucker
*Attorney, Agent, or Firm*—Needle & Rosenberg, P.C.

[57] ABSTRACT

An apparatus for isolating data receiving entity from a data sending entity includes a first data channel, coupled to the data sending entity, and a second data channel, coupled to the data receiving entity. A data encryption chip decrypts data received from the data sending entity and encrypts data sent to the data sending entity. A processor is programmed to compare a plurality of data words received from the first data channel to at least one data word characteristic of a data virus and to assert a control signal when a data word received from the first data channel corresponds to a data word characteristic of a data virus. An optical isolator is capable of isolating the first data channel from the second data channel when the processor detects a data virus. A controllable power supply is responsive to the control signal from the processor and coupled to the optical isolator, which provides power to the optical isolator only when the control signal from the processor is not asserted.

12 Claims, 3 Drawing Sheets

METHOD AND APPARATUS FOR ISOLATING AN ENCRYPTED COMPUTER SYSTEM UPON DETECTION OF VIRUSES AND SIMILAR DATA

CROSS-REFERENCE TO RELATED APPLICATION

This is a continuation-in-part of my copending applications filed Oct. 22, 1997, Ser. No.: 08/955,912, the disclosure for which is incorporated herein by reference.

BACKGROUND OF THE INVENTION

1. Field of the Invention

This invention relates to computer systems. More particularly, this invention relates to a method and apparatus for isolating a computer system upon detection of a virus and similar data.

2. The Prior Art

Recently, transmission of data viruses over the Internet has become a serious concern for Internet users. To reduce the concern, several methods are used to isolate computers from the Internet while the users are in local mode. However, when users of such methods are in a connected mode, they become prey to any virus that they may unwittingly download.

Computer virus scanners are common and can be used to detect a virus once it is downloaded. However, such scanners cannot prevent the virus from being downloaded. They can only aid in the identification of a virus once it has already infected the user's computer.

Data security involving data networks is also an important concern. Many systems encrypt data sent over a network. However, no existing systems provide both data encryption/decryption and virus detection, thereby ensuring complete data security for transmitted and received data.

Nowhere does the prior art disclose a method or apparatus for detecting a virus as it is being received from a network and isolating the user's computer from the Internet when an incoming virus is detected.

SUMMARY OF THE INVENTION

The above-noted disadvantages of the prior art are overcome by the present invention, which in one aspect is an apparatus for isolating a data receiving entity from a data sending entity. A first data channel is coupled to the data sending entity and a second data channel is coupled to the data receiving entity. A circuit facilitates encryption and decryption of the data being received from and transmitted to the data sending entity. A processor is operationally coupled to the first data channel and detects a data virus received from the first data channel. An isolation circuit that is responsive to the processor couples the first data channel to the second data channel when the processor does not detect a data virus and isolates the first data channel from the second data channel when the processor detects a data virus.

In another aspect, the invention includes a first data channel coupled to the data sending entity and a second data channel coupled to the data receiving entity. A data encryption chip is operationally coupled to the first data channel. A processor, operationally coupled to the data encryption chip and that is programmed to compare a plurality of data words received from the first data channel to at least one data word characteristic of a data virus asserts a control signal when a data word received from the first data channel corresponds to a data word characteristic of a data virus. A memory, that is operationally coupled to the processor, stores at least one data word characteristic of a data virus. The memory presents to the processor at least one data word characteristic of a data virus and an input buffer stores data received by the processor from the first data channel. An optical isolator, coupled to the first data channel and the second data channel and having an enable signal input, is capable of isolating the first data channel from the second data channel when the enable signal input is not asserted and is also capable of placing the first data channel and the second data channel in optical communication with each other when the enable signal input is asserted. A controllable power supply that is responsive to the control signal from the processor is coupled to the enable signal input of the optical isolator. The power supply asserts the enable signal when the control signal is not asserted and does not assert the enable signal when the control signal is asserted, thereby causing the optical isolator to isolate the first data channel from the second data channel.

In yet another aspect, the invention is a method for isolating data receiving entity from a data sending entity. When a data virus received from the data sending entity is detected, the data sending entity is isolated from the data receiving entity.

An advantage of the invention is that it prevents a data receiving entity, such as a computer, from receiving a virus from a data sending entity, such as a computer network.

A further advantage of the invention is that it isolates the data sending entity from the data receiving entity without disrupting normal operation of either entity.

A further advantage of the invention is that it allows for encryption and decryption of communicated data.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
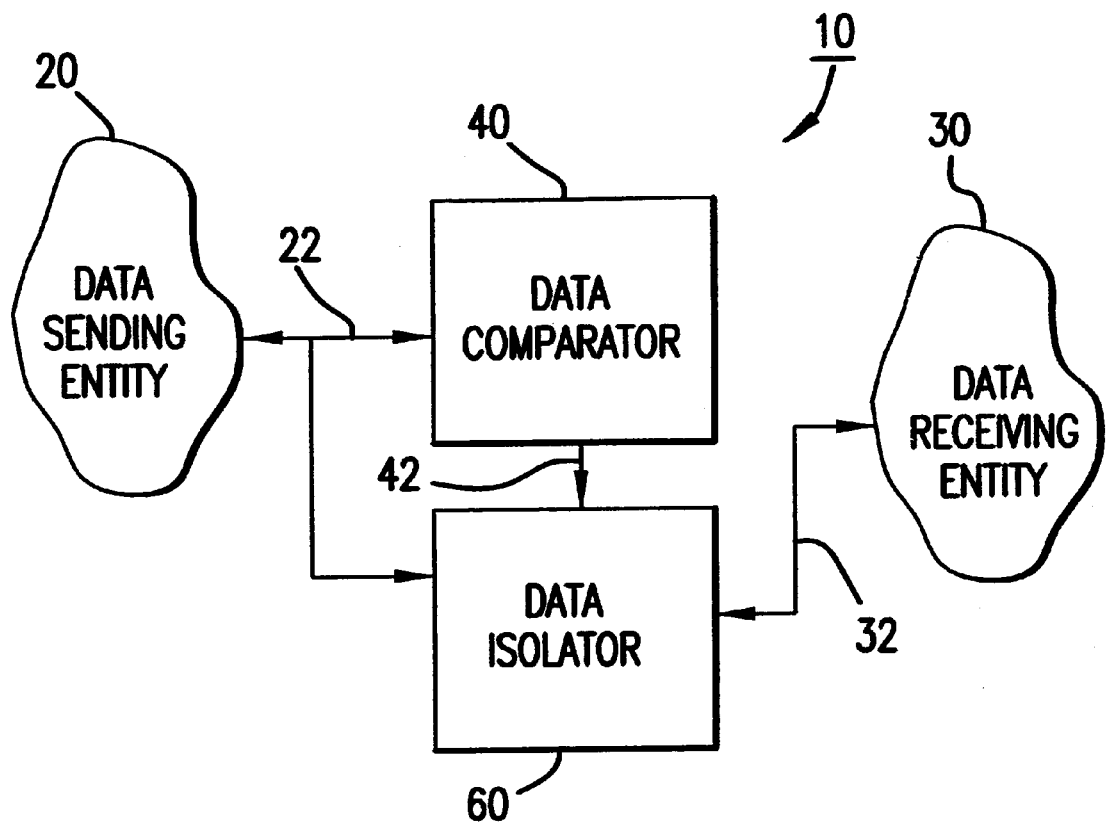
FIG. 1 is a simplified schematic diagram of the invention.

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also, as used in the description herein and throughout the claims that follow, the meaning of "in" includes "in" and "on" unless the context clearly dictates otherwise.

As shown in FIG. 1, the apparatus 10 of the invention evaluates data received from a data sending entity 20, such as the Internet, by a data receiving entity 30, such as a personal computer or even a local area network. The data is received via a first data channel 22 coupled to the data sending entity 20 and a second data channel 32 coupled to the data receiving entity. A data comparator 40 is operationally coupled to the first data channel 22 and is used to detect data viruses received from the first data channel 22. When a virus is detected, a data isolator 60, that is responsive to a control signal 42 from the data comparator 40, isolates the first data channel 22 from the second data channel 32. Thus, viruses are detected and prevented from being received by the data receiving entity 30.

Figure 2:
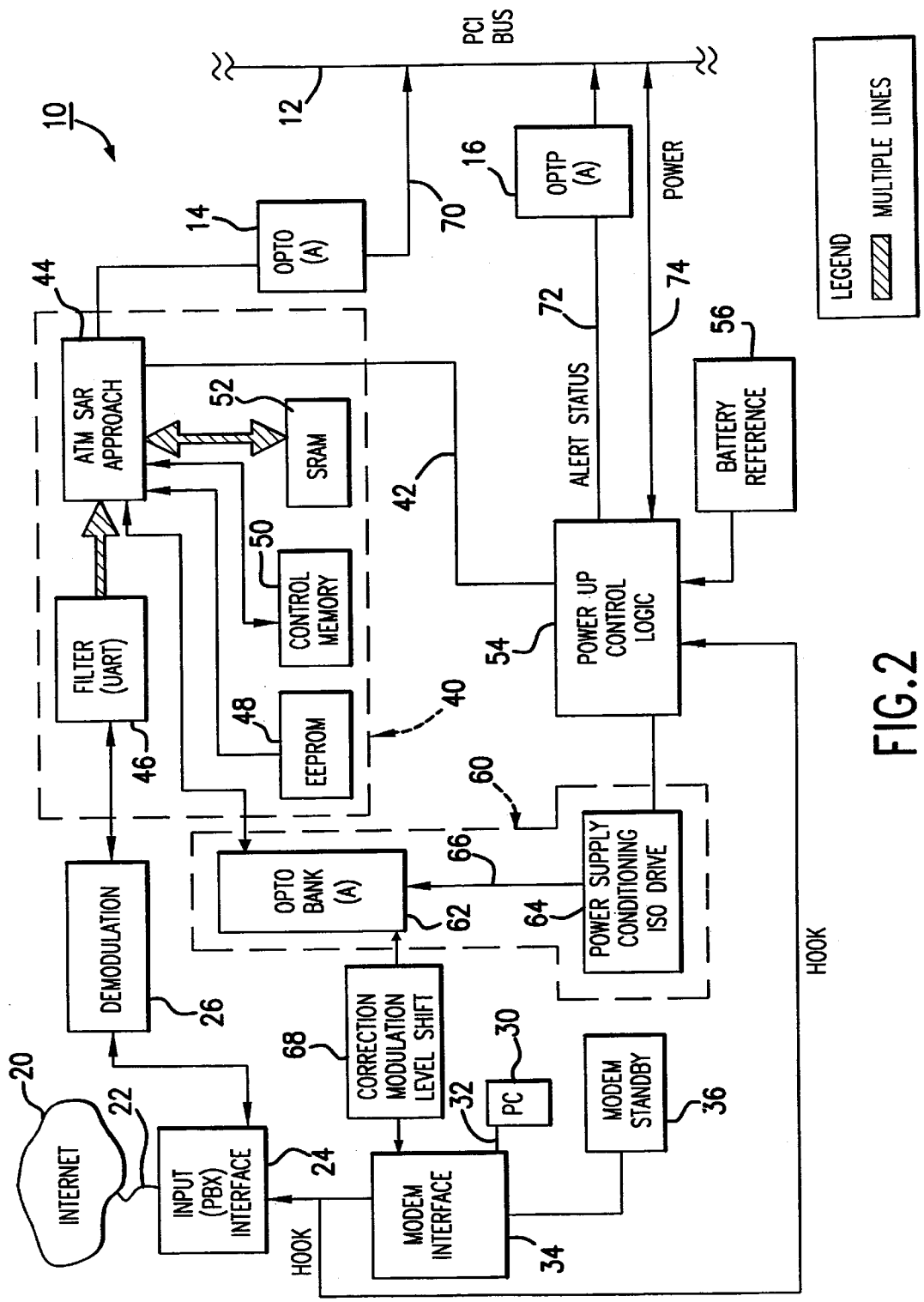
FIG. 2 is a detailed schematic diagram of the invention.

As shown in FIG. 2, the apparatus 10 of one preferred embodiment of the invention interfaces with a peripheral control interface (PCI) 12 of a data receiving entity 30, such as a personal computer, to provide isolation from a data sending entity 20, such as the Internet. The data sending entity 20 is connected to an input interface 24, such as a standard PBX interface, via a first data channel 22. The data stream received by the input interface 24 is demodulated using a demodulator circuit 26 so as to conform to the data format of the data receiving entity 30.

The data stream is then fed into the data comparator 40. In the comparator circuit 40, a UART chip 46 formats the incoming serial data into parallel data words and a processor 44, such as a PCI host controller, using an asynchronous transfer mode segmentation and reassembly, compares the parallel data with known virus signatures stored in a memory 48, such as an EEPROM The processor 44, which is controlled by a control memory 50, buffers data from the UART chip 46 in a memory chip 52 as it awaits virus scanning analysis.

After the processor 44 has analyzed an incoming word, it is then sent to the data isolator 60 for eventual transfer to the data receiving entity 30. The data isolator 60 comprises an optical isolator 62 that is driven by a power enable signal 66 received from a power supply conditioning ISO drive 64. The power supply conditioning ISO drive 64 receives power from a power up control logic circuit 54 which receives power from a power line 74 in the PCI bus 12.

If no virus is found, the data stream is transferred through the optical isolator 62 to a modulation level shifting circuit 68, that conditions the data for receipt by the data receiving entity 30, to a modem interface 34. The modem interface 34 provides protocol matching to the input interface 24 and sends the data to the data receiving entity 30.

When a virus is detected in the incoming data stream, a control line 42 from the processor 44 causes the power up control logic circuit 54 to cause the power supply conditioning ISO drive 64 to cut off power to the optical isolator 62, thereby causing the optical isolator 62 to prevent passage of data therethrough. A modem standby circuit 36 then takes over and simulates protocol exchanges with the input interface 24, thereby preventing an abnormal disconnect.

During power-up, the processor 40 runs the system through a self checking routine. If any system abnormalities are detected, an interrupt line 70 is asserted. The interrupt line 70 passes through an optical isolator 14 to ensure unidirectional data transmission to the PCI bus 12.

The power up control logic circuit 54 also performs a self check. A battery reference 56 is compared to the value on the incoming power line 74 from the PCI bus 12, and if the system is improperly powered, an interrupt line 72 is asserted. The interrupt line 72 is also passed through an optical isolator 16 that ensures that the interrupt line 72 is unidirectional to the PCI bus 12.

Figure 3:
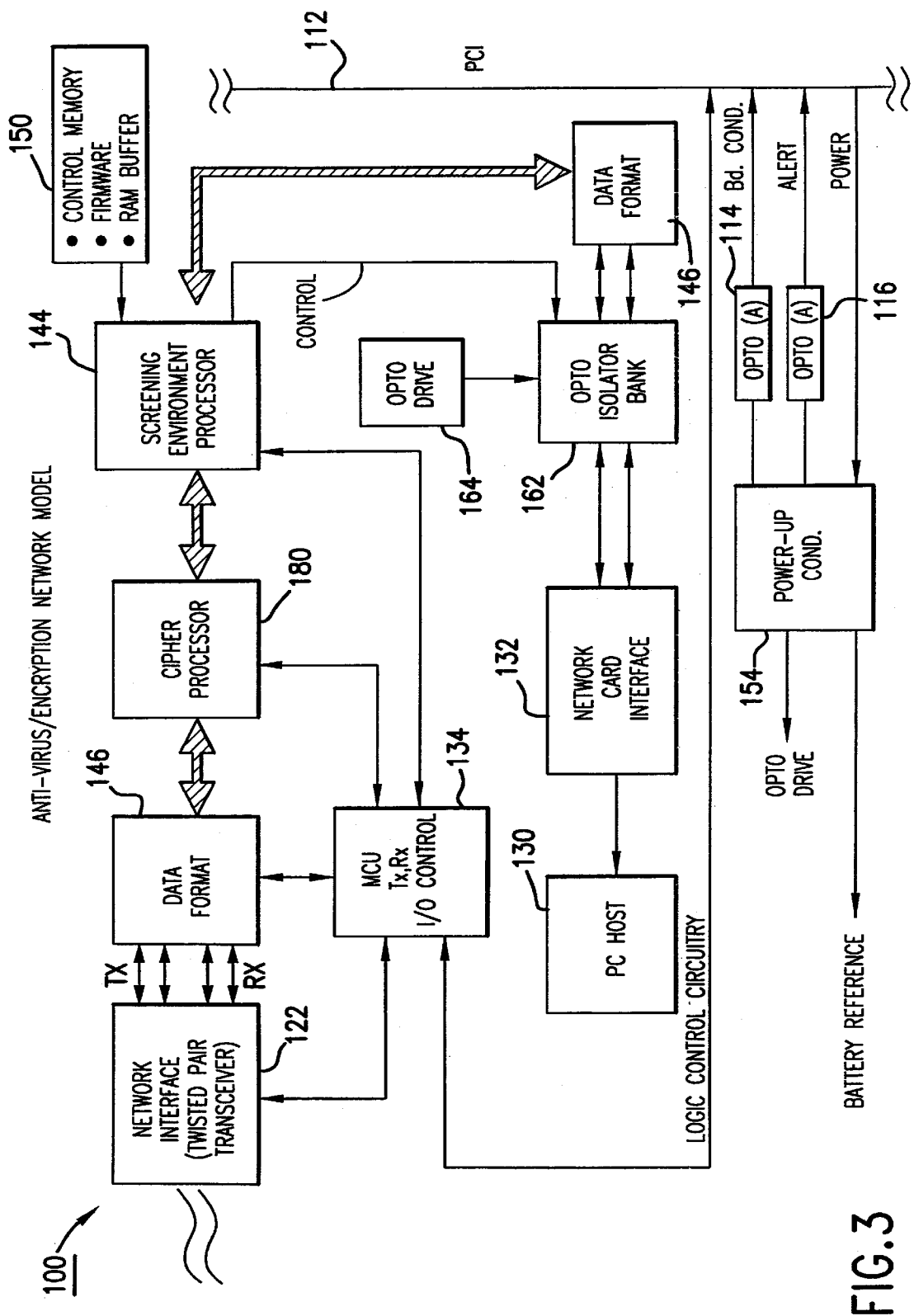
FIG. 3 is a detailed schematic diagram of an embodiment of the invention that includes data encryption.

As shown in FIG. 3, an embodiment of the invention 100 that includes data encryption/decryption includes a data cipher processor 180 to encrypt/decrypt communicated data. The cipher processor 180 could be a TUNDRA CA95C68, or other encryption chip. In this embodiment, data is received from the network by a network interface 122, which would be a standard RJ45 connection, or similar network interface. A data format chip 146 formats the data for the cipher processor 180, which provides decrypted data to the screening environment processor 144. The screening environment processor 144, which provides virus detection, could comprise a digital signal processing (DSP) chip, such as an ADSP-2181 and is serviced by a memory 150. A micro-controller 134 is provided to control the data processing elements in the invention 100, sends control information to the host computer's PCI bus 112 and initiates communication handshaking. The screening environment processor 144 provides a control signal to an opto-isolator bank 162, which isolates the host personal computer 130 from the network interface 122 upon detection of a virus.

Data from the opto-isolator bank 162 is conditioned by a network interface card 132 to make it suitable for the personal computer 130. An opto drive 164 conditions power to the opto-isolator bank 162.

A power-up conditioner 154 taps power from the PCI bus 112 and provides power to the opto-drive 164. The power-up conditioner 154 also sends status signals to the PCI bus 112 though a pair of opto-isolators 114, 116 used to maintain unidirectional data transfer. A battery reference 156 provides the powerup conditioner 154 with a voltage reference, to facilitate self checking functions.

The above described embodiment is given as an illustrative example only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An apparatus for isolating data receiving entity from a data sending entity, comprising:

a. a first data channel, coupled to the data sending entity;
   b. a second data channel, coupled to the data receiving entity;
   c. means, operationally coupled to the first data channel, for detecting a data virus received from the first data channel;
   d. an optical isolator, responsive to the detecting means, that couples the first data channel to the second data channel when the detecting means does not detect a data virus and that isolates the first data channel from the second data channel when the detecting means detects a data virus; and
   e. means for decrypting data received from the first data channel and for encrypting data transmitted to first data channel.

2. An apparatus for isolating data receiving entity from a data sending entity, comprising:

a. a first data channel, coupled to the data sending entity;
   b. a second data channel, coupled to the data receiving entity;
   c. means, operatively coupled to the first data channel and to the second data channel, for decrypting data received from the first data channel and for encrypting data transmitted to first data channel;
   d. means for comparing a plurality of data words received from the first data channel to at least one data word characteristic of a data virus and for asserting a control signal when a data word received from the first data channel corresponds to a data word characteristic of a data virus; and e. an optical isolator, coupled to the first data channel and the second data channel and operationally coupled to the control signal, that isolates the first data channel from the second data channel when the control signal is asserted and that places the first data channel and the second data channel in optical communication when the control signal is not asserted.

3. The apparatus of claim 2, wherein the comparing means comprises:

a. a processor; and b. means for presenting to the processor at least one data word characteristic of a data virus.

4. The apparatus of claim 3, wherein the decrypting and encrypting means comprises a data encryption chip.

5. The apparatus of claim 3, wherein the presenting means comprises a memory, operationally coupled to the processor, that stores at least one data word characteristic of a data virus.

6. The apparatus of claim 3, further comprising an input buffer that stores data received by the processor.

7. The apparatus of claim 2, wherein data on the first data channel is transmitted in a serial format and wherein the apparatus further comprises means for converting segments of serial data received from the first data channel to data in a parallel format.

8. The apparatus of claim 7, further comprising a controllable power supply responsive to the control signal from the comparing means, the power supply generating an enable signal when the control signal is not asserted, wherein the optical isolator is powered by the enable signal so that when the optical isolator receives power from the enable signal, the first data channel and the second data channel are in optical communication with each other.

9. An apparatus for isolating data receiving entity from a data sending entity, comprising:

a. a first data channel, coupled to the data sending entity;

b. a second data channel, coupled to the data receiving entity;

c. a data encryption chip, operatively coupled to the first data channel and to the second data channel, for decrypting data received from the first data channel and for encrypting data transmitted to first data channel;

d. a processor that is programmed to compare a plurality of data words received from the first data channel to at least one data word characteristic of a data virus and to assert a control signal when a data word received from the first data channel corresponds to a data word characteristic of a data virus;

e. a memory, operationally coupled to the processor, that stores at least one data word characteristic of a data virus that presents to the processor at least one data word characteristic of a data virus;

f. an input buffer that stores data received by the processor from the first data channel;

g. an optical isolator, coupled to the first data channel and the second data channel and having an enable signal input, that is capable of isolating the first data channel from the second data channel when the enable signal input is not asserted and is capable of placing the first data channel and the second data channel in optical communication with each other when the enable signal input is asserted; and h. a controllable power supply responsive to the control signal from the processor and coupled to the enable signal input of the optical isolator, the power supply asserting the enable signal when the control signal is not asserted and the power supply not asserting the enable signal when the control signal is asserted, thereby causing the optical isolator to isolate the first data channel from the second data channel.

10. The apparatus of claim 9, wherein the processor comprises a PCI host controller.

11. The apparatus of claim 9, wherein data on the first data channel is transmitted in a serial format and wherein the apparatus further comprises means for converting segments of serial data received from the first cata channel to data in a parallel format.

12. A method for isolating data receiving entity from a data sending entity, comprising:

a. detecting a data virus received from the data sending entity;

physically isolating with an optical isolator the data sending entity, from the data receiving entity upon detecting a data virus received from the data sending entity;

c. decrypting data received from the data sending entity by the data receiving entity; and d. encrypting data sent from the data receiving entity to the data sending entity.

* * * * *